United States Patent [19]
Huignard et al.

[11] Patent Number: 5,488,630
[45] Date of Patent: Jan. 30, 1996

[54] SYSTEM FOR ACQUIRING AND COMPRESSING PULSE TRAINS

[75] Inventors: Jean Huignard, Creteil; Patrick Sauvin, Ris-Orangis, both of France

[73] Assignee: Sodena, Halluin, France

[21] Appl. No.: 244,515

[22] PCT Filed: Sep. 27, 1993

[86] PCT No.: PCT/FR93/00941

§ 371 Date: Jun. 1, 1994

§ 102(e) Date: Jun. 1, 1994

[87] PCT Pub. No.: WO94/08251

PCT Pub. Date: Apr. 14, 1994

[30]    Foreign Application Priority Data

Oct. 1, 1992  [FR]  France .................... 92 11981

[51] Int. Cl.$^6$ .............................. H04B 1/707; H04B 1/69
[52] U.S. Cl. ................ 375/206; 375/200; 380/34
[58] Field of Search ................... 375/1, 200–210; 380/34; 370/18; 455/39, 49.1

[56]    References Cited

U.S. PATENT DOCUMENTS 5,305,347  4/1994  Roschmann et al. ............... 375/1

FOREIGN PATENT DOCUMENTS 0166911  1/1986  European Pat. Off. ......... G01S 5/14

OTHER PUBLICATIONS

New Electronics Incorporating Electronics Today, vol. 24, No. 1, Jan. 1991, pp. 20–22.
NTC 1983, IEEE '83 National Telesystems Conference, Nov. 14–16, 1983, pp. 214–218.
IEEE Plans '90 Position Location and Navigation Symposium Record, Mar. 20–23, 1990, pp. 286–292.
IBM Technical Disclosure Bulletin, vol. 15, No. 1, Jun. 1972, J. W. Irwin, pp. 111–113.

*Primary Examiner*—Bernarr E. Gregory
*Attorney, Agent, or Firm*—Sughrue, Mion, Zinn, Macpeak & Seas

[57]    ABSTRACT

The present invention relates to receiver systems for receiving trains of pulses transmitted by satellites. The receiver system is characterized by the fact that it includes receiver means (100) for receiving pulses trains transmitted by the satellites and suitable for delivering signal trains representative of pulse trains, first compression means (102) for compressing signal trains by a factor n having an input (103) connected to the output (101) of the receiver means (100), demodulator means (104) having three inputs (105, 106, 107), the output (122) of the compression means (102) being connected to the input (105), a satellite code signal generator (108) connected to the demodulator means (104), a Doppler shift carrier signal train generator (109), and second compression means (102) connected between the generator (109) and the demodulator means (104).

9 Claims, 2 Drawing Sheets

SYSTEM FOR ACQUIRING AND COMPRESSING PULSE TRAINS

BACKGROUND OF THE INVENTION

The present invention relates to receiver systems having a particularly advantageous application for receiving pulse trains coming from satellites, e.g. for the purpose of determining the position of a land, sea, or air vehicle having the system on-board, i.e. systems known under the initials "G.P.S.".

One such receiver system for receiving pulse trains transmitted by satellites is described in EP-A-0 166 911, in particular.

In brief, that receiver system comprises a receiver for receiving pulse trains transmitted by the satellite, a demodulator whose first input is connected to the output of the receiver means, two generators: a code signal generator at the frequency of the pulse trains transmitted by the satellites and a Doppler shift carrier signal train generator. The outputs of those two generators are connected respectively to second and third inputs of the demodulator, the signals delivered by the demodulator serving, for example, to determine the position of a vehicle including such a receiver.

Other systems for receiving pulse trains transmitted by satellites, in particular, are described in numerous other documents, for example in the article entitled "A GPS fast acquisition receiver" published in the journal IEEE 1983 National Telesystems Conference, San Francisco, Calif., US, 14th–16th Nov. 1983, pages 214–218, and in the article entitled "Receivers for the NAVSTAR global positioning system" published in the journal Proceedings of the IEE-F Communications Radar and Signal Processing, Vol. 127, No. 2, April 1980, pages 163–167.

The use of such receiver devices is becoming more and more common, particularly because of the density of the network of satellites to be found in geostationary positions around the earth, since the signals which are transmitted by such satellites can be received on the earth and can be interpreted, e.g. by the so-called "triangulation" method, to determine the position of the point at which they have been received.

To implement the system briefly outlined above, it is necessary firstly for the satellites to send information repetitively in the form of digital pulse trains that are encoded using a coding systems relating to each satellite, and secondly for there to exist receiver systems suitable for receiving said information as transmitted by the satellites and for decoding it. Such receiver systems can be located, for example, on board vehicles whose position relative to the earth needs to be established. This applies, for example, to ships at sea or to aircraft or to other vehicles that move in the atmosphere.

That technique gives good results, however implementation thereof is relatively lengthy. The coded pulse trains transmitted by the satellite are relatively long in duration, e.g. several seconds, and in order to identify the satellite transmitting the pulses it receives, a "G.P.S." receiver must as a general rule process a plurality of successive pulse trains transmitted by said satellite so as to be capable firstly of identifying the satellite and secondly of extracting the data required for deducing the desired information therefrom.

In some cases, e.g. for determining the position of a ship at sea, the error in the position of the ship due to the time taken to implement the technique is of no consequence since the vehicle is moving at a relatively low speed. However that is not true of vehicles such as aircraft flying at high speed, or rockets, etc., where such errors can give rise to sever consequences such as accidents, collisions, etc.

SUMMARY OF INVENTION

An object of the present invention is to provide an improvement to a system for receiving pulse trains transmitted by satellites, in particular in a so-called "G.P.S." system, for significantly reducing the time required for analyzing the signals contained in said pulse train, thereby reducing the response time of prior art receiver systems.

More precisely, the present invention provides a receiver system for receiving pulse trains transmitted by satellites, the system being characterized by the fact that it comprises:

receiver means for receiving said pulse trains and suitable for delivering at their output signal trains representative of said pulse trains;

first compression means for compressing signal trains by a factor n having an input connected to the output of the receiver means;

demodulator means comprising three inputs, a first input, a second input, and a third input, the output of said first signal compression means being connected to the first input of said demodulator means;

first and second generators suitable for delivering at their respective outputs respectively satellite code signals and trains of Doppler shift carrier signals, the output of the first generator being connected to the second input of the signal demodulator means; and second compression means for compressing signal trains by a factor n, the input and the output of said second compression means being respectively connected to the output of said second generator and to the third input of said demodulator means.

BRIEF DESCRIPTION OF THE DRAWINGS

Other characteristics and advantages of the present invention appear from the following description given with reference to the accompanying drawings by way of non-limiting illustration, in which.

DESCRIPTION OF PREFERRED EMBODIMENT

Figure 1:
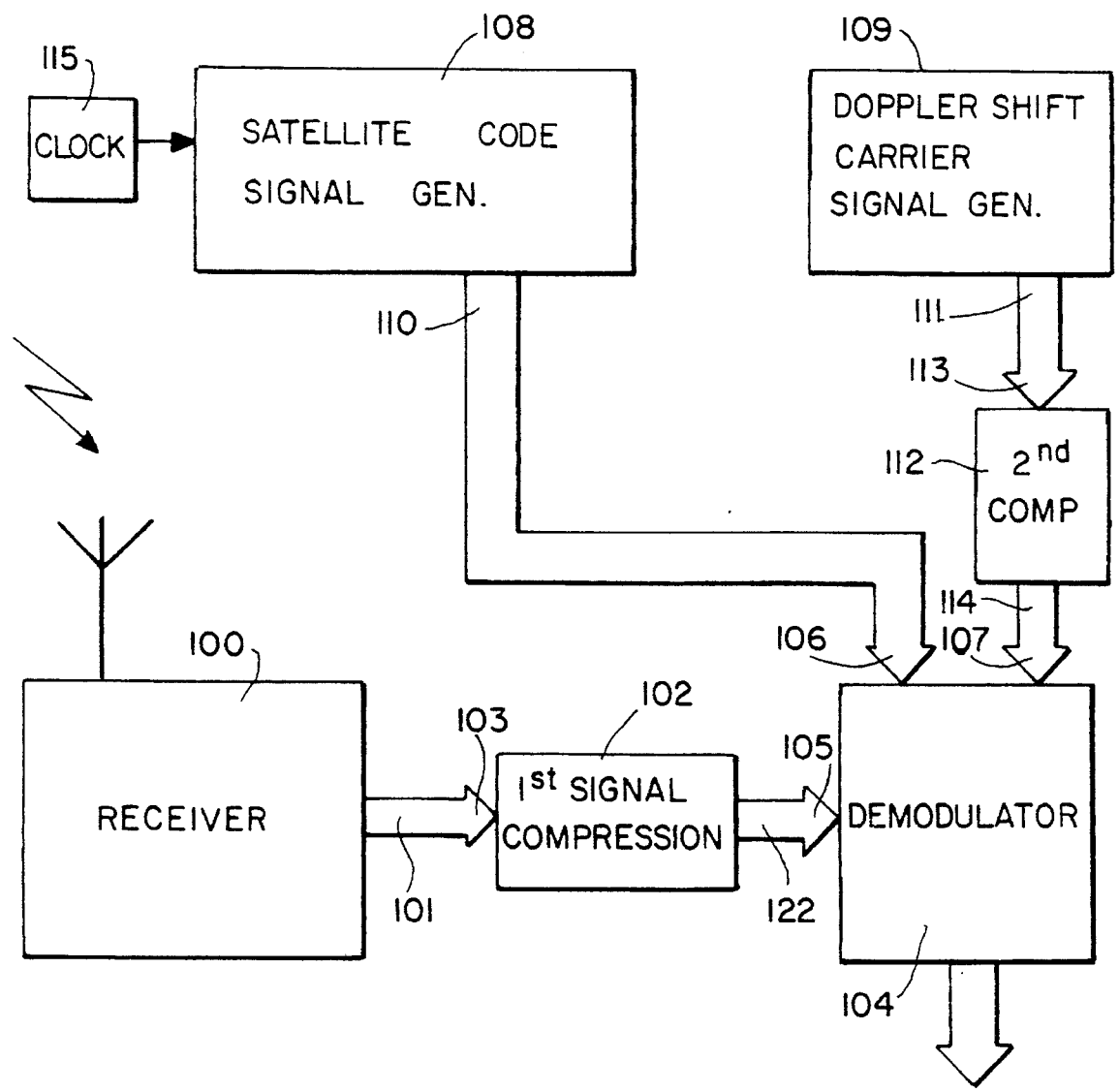
FIG. 1 is a block diagram of an embodiment of a receiver system of the invention for receiving pulse trains.

FIG. 1 is a block diagram of an embodiment of a receiver system of the invention for receiving pulse trains. This system includes receiver 100 for receiving pulse trains transmitted by satellites, for example, which means are suitable for delivering on their output 101, trains of signals in suitable form, e.g. in the electrical form for ease of processing, and representative of the received trains of pulses as transmitted by the satellites, followed by first signal compression circuitry 102 whose input 103 is connected to the output 101 of the receiver 100.

The receiver system further includes demodulation circuitry 104 that is known per se, in particular from the above-mentioned documents, which demodulation circuitry includes three inputs: a first input 105, a second input 106, and a third input 107; the output 122 of the signal compression means 102 being connected to the first input 105.

The receiver system further includes a first generator 108 and a second generator 109 suitable for delivering on their respective outputs 110 and 111, respectively satellite code signals and trains of Doppler shift carrier signals, said code signals and said signal trains being optionally phase controlled. These generators are known per se and are therefore not described in greater detail.

The output 110 of the first generator 108 is connected to the second input 106 of the signal demodulator circuitry 104, while the output 111 of the second generator 109 is connected to the third input 107 of the demodulator circuitry 104 via second compression means 112 having an input 113 and an output 114.

Advantageously, the receiver system includes a clock 115 for controlling the frequency of the satellite code signals delivered by the first generator 108, by controlling the frequency of the clock signals serving to generate signals of determined frequency at the output 110.

Figure 2:
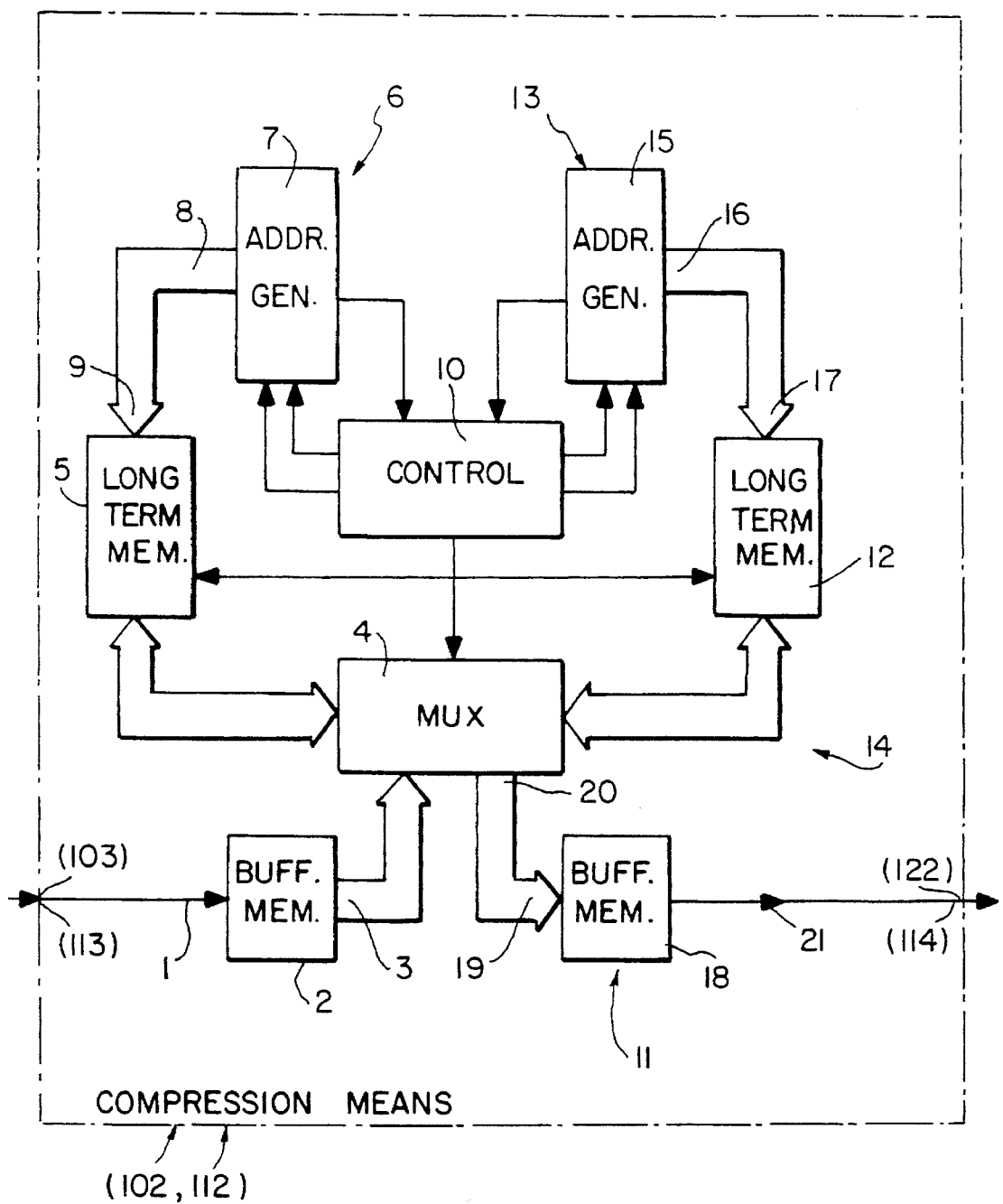
FIG. 2 is a block diagram of an embodiment of the compression means used in the FIG. 1 receiver system for receiving pulse trains.

FIG. 2 is a block diagram of an advantageous embodiment of the above-defined compression circuitry, given that in a preferred embodiment, both of the compression circuitry 102 and 112 included in the pulse train receiver system of FIG. 1 can be identical in structure and can both comply with the embodiment shown in FIG. 2.

Starting from their input 1 which constitutes either the input 103 of the first compression circuitry 102 or else the input 113 of the second compression circuitry 112, the compression circuitry comprise a first temporary memory 2 suitable for receiving the pulse trains received from said input 1 at a first frequency f and for storing a predetermined number p of said pulses temporarily, where the number p is less than the total number m of pulses in a train. When the pulse trains are in the form of binary digital signals, the number p is advantageously equal to eight, i.e. one byte.

The temporary memory 2 is also suitable, when full, for delivering all p pulses it contains on an output 3.

The compression circuitry further include means 6 for transferring the m pulses of a train into a first longer-term memory 5 in packets of p pulses, said transfers taking place whenever a number p of pulses have been stored in the first temporary memory 2. Element 6 is essentially constituted by a multiplexer circuit 4 whose input is connected to the output 3 of the temporary memory 2, an address generator 7 whose control output 8 is connected to a control input 9 of the first longer-term memory 5, and a control member 10 including outputs respectively connected to the address generator 7 and to the multiplier 4.

In addition, the compression means 102, 112 include first means 11 for reading the contents of the first longer-term memory 5, for example whenever it contains the m pulses of a train, said m pulses being read by the first read means 11 at a second frequency F where F is greater than the first frequency f, and this is done in the chronological order of the pulses in a train, the first and second frequencies F and f being related to each other by the relationship: F=n.f, where n is an integer greater than unity.

The compression circuitry 102, 112 include a second longer-term memory 12 suitable for containing at least the m pulses of a train, means 13 for transferring the m pulses of a train into the second longer-term memory 12 in packets of p pulses whenever p pulses have been stored in the temporary memory 2, with the packets of p pulses being transferred to the second longer-term memory 12 only via the control member 10 and only when the first longer-term memory 5 is full, i.e. when it contains the m pulses of a train.

These compression circuits also include second circuits 14 for reading the contents of the second longer-term memory 12 when, for example, it contains the m pulses of a train, the m pulses being read by the second read means 14 successively at the above-mentioned second frequency F, in their chronological order in a train, and at the same time as the first longer-term memory 5 is being fed with pulses by the temporary memory 2.

In the embodiment described above, the means 13 for transferring packets of p pulses contained in the temporary memory 2 into the second longer-term memory 12 include, like the above-described transfer means 6, a multiplexer 4 and a control member 10 which it shares in common with the first transfer means 6, and an address generator 15 whose control output 16 is connected to the control input 17 of the second longer-term memory 12.

Finally, in an advantageous embodiment of these compression circuits 102, 112, the means 11 and 14 for reading the contents of the first and second longer-term memories 5 and 12 include a second temporary memory 18 whose input 19 is connected to the output 20 of the multiplexer circuit 4. This second temporary memory 18 is suitable for receiving via its input 19 packets comprising a determined number q of pulses coming from the first longer-term memory 5 or from the second longer-term memory 12, and for storing q pulses temporarily and for delivering the pulses successively at an output 21, which output 21 constitutes either the output 122 of the first compression circuitry 102 or the output 114 of the second compression circuitry 112. This number of pulses g is less than the number m of pulses in a train, and it is advantageously equal to the above-defined number p. When the pulses are constituted by binary digital signals, then q is advantageously chosen to be equal to eight, thus constituting one byte, like the temporary memory 2.

The control member 10 includes means for emptying the contents from one of the two longer-term memories 5, 12 when, as explained below, its contents has been read n times and the other longer-term memory is full. These means are advantageously constituted by means for deletion by overwriting, i.e. that delete the contents of a memory by writing a new pulse train into the memory.

The compression circuitry as described above with reference to FIG. 2 operate as follows:

Initially it is assumed that a succession of pulse trains is applied to the input 1, each train including m pulses transmitted at a frequency f. Assume that a first train is arriving on the input 1. The first temporary memory 2 begins by storing the first p pulses of said first train, e.g. a first byte. Once this first byte has been stored, it is transferred in parallel by the transfer means 6 into the first longer-term memory 5 in which each pulse is accurately addressed. These two storage operations, one in a temporary memory the other in a longer-term memory, are repeated until the m pulses of the first train have been stored in the first longer-term memory 5 in packets of p pulses.

The m pulses of the first train contained in the first longer-term memory 5 are then read, byte by byte, by the read means 11 via the second temporary memory 18, with the pulses constituting each byte being read at the frequency F as defined above.

The m pulses of the first train are thus transmitted to the output 21 to be processed as required for obtaining the looked-for information, and they are translated in their chronological order within the train but at a frequency that is n times greater than the frequency at which they were transmitted. As a result, firstly the pulse train obtained at the output 21 is an image of the pulse train received on the input 1, but compressed by a factor n, and secondly, while the second longer-term memory 12 is filling as described above, the first longer-term memory can be read n times since the frequency F at which the pulses are read is n times greater than the frequency f, and the number n is an integer greater than unity.

When the first longer-term memory 5 contains the m pulses of the first train and while they are being read by the first read means 11, a second pulse train arrives at the input 1 and is in turn stored in the second longer-term memory 12 using the same process as was used for reading the first train into the first longer-term memory 5.

When the second longer-term memory 12 contains the m pulses of the second train, the first longer-term memory 5 is emptied to be ready for storing the third train in the same manner as the first simultaneously with the contents of the second longer-term memory being read in the same manner as was read the contents of the first. The above-described compression circuitry 102 and 112 make it possible to achieve a large pulse compression factor n.

From the above description, it can be seen that the pulse train receiver system of the invention operates in the same manner as a prior art system. However, since:

the signals delivered at the output 101 of the receiver 100 are compressed by the means 102 by a factor n;

the frequency of the satellite code signals at the output 110 of the first generator 108 is multiplied by a number n; and since the Doppler frequency signals transmitted by the generator 109 are compressed by the means 112 using the same factor n;

the pulse train receiver system of the invention has a much shorter response time than prior art receiver systems, and in particular the response time is divided by a factor n. Such a system can therefore be used in numerous applications in which speed of detection is of great importance.

We claim:

1. A receiver system for receiving pulse trains transmitted by satellites, the system comprising:

receiver means (100) for receiving said pulse trains and for delivering at an output signal trains representative of said pulse trains;

first compression means (102) for compressing signal trains by a factor n, said first compression means having an input (103) connected to said output (101) of the receiver means (100) and said first compression means having an output;

demodulator means (104) having three inputs, a first input (105), a second input (106), and a third input (107), said output (106) of said first compression means (102) being connected to the first input (105) of said demodulator means (104);

first and second generators (108, 109) for delivering at respective outputs thereof (110, 111) respectively satellite code signals and trains of Doppler shift carrier signals, the output (110) of the first generator (108) being connected to the second input (106) of the demodulator means (104); and second compression means (112) for compressing signal trains by a factor n, said second compression means having an input (113) and an output (114), said input of said second compression means (112) being respectively connected to the output (111) of said second generator (109) and said output of said second compression means to the third input (107) of said demodulator means (104).

2. A system according to claim 1, wherein at least one of said first and second compression means (102, 112) compresses said signal trains having m pulses transmitted at a first frequency f and comprises:

first temporary memory means (2) for receiving said pulses via an input (1), said first temporary memory means temporarily storing a predetermined number p of said pulses, where p is less than the total number m of pulses in a train;

first longer-term memory means (5) for storing a number of said pulses, not less than said number m;

first means for transferring (6) the said m pulses of an output signal train into said first longer-term memory means in packets of p pulses each whenever p pulses have been stored in said first temporary memory means; and first means for reading (11) the m pulses of said stored train from the first longer-term memory means (5), said m pulses being read in their chronological order in said train and at a second frequency F that is equal to n times said first frequency f.

3. A system according to claim 2, wherein said compression means (102, 112) further include:

second longer-term memory means (12) for storing a number of said pulses that is not less than said number m;

second means for transferring (13) said m pulses of a train into said second longer-term memory means in packets of p pulses whenever p pulses have been stored in said first temporary memory means (2), and when said first longer-term memory means contain m pulses; and second means for reading (14) the m pulses stored in the second longer-term memory means (12), said m pulses being read in chronological order in said pulse train and at said second frequency F, simultaneously with said first longer-term memory means (5) being fed from said first temporary memory means (2).

4. A system according to claim 3, wherein; the first and second means for reading (11, 14) the contents of the first and second longer-term memory means (5, 12) at said second frequency F include second temporary memory means (18) suitable for receiving at an input (19), packets comprising a number q of pulses received from said first or said second longer-term memory means, said second temporary memory means for temporarily storing q pulses, said number of pulses q being less than the total number m of pulses in a train, and said second temporary memory means delivering said pulses in succession at an output thereof.

5. A system according to claim 4, wherein the number of pulses p and q are equal to each other and have a value of eight.

6. A system according to claim 5, wherein said first and second compression means (102, 112) each include means for emptying the contents from a longer-term memory when said contents has been read n times and the other longer-term memory has just stored the m pulses of a new pulse train.

7. A system according to claim 6, wherein the means for emptying the contents of a longer-term memory when said contents has been read n times and the other longer-term memory has just stored the m pulses of a new pulse train comprise means for deletion by over-writing said contents.

8. A system according to claim 2, wherein the number n is an integer greater than one.

9. A system according to claim 1, further including means for controlling (115) the frequency of the satellite code signal delivered by said first generator (108).

* * * * *